(12) United States Patent
Kim

(10) Patent No.: US 9,789,539 B2
(45) Date of Patent: Oct. 17, 2017

(54) NANOMETAL-FLAKE-GRAPHITE COMPOSITE AND METHOD OF MANUFATURING THE SAME

(71) Applicant: Cheorwon Plasma Research Institute, Gangwon-do (KR)

(72) Inventor: Seong-In Kim, Gangwon-do (KR)

(73) Assignee: CHEORWON PLASMA RESEARCH INSTITUTE, Gangwon-Do (KR)

( * ) Notice: Subject to any disclaimer, the term of this patent is extended or adjusted under 35 U.S.C. 154(b) by 0 days.

(21) Appl. No.: 15/108,034

(22) PCT Filed: Dec. 23, 2014

(86) PCT No.: PCT/KR2014/012731
§ 371 (c)(1),
(2) Date: Jun. 24, 2016

(87) PCT Pub. No.: WO2015/099415
PCT Pub. Date: Jul. 2, 2015

(65) Prior Publication Data
US 2016/0318100 A1    Nov. 3, 2016

(30) Foreign Application Priority Data
Dec. 26, 2013   (KR) .......................... 10-2013-0164154

(51) Int. Cl.
| | | |
|---|---|---|
| B22F 1/02 | (2006.01) | |
| B82B 3/00 | (2006.01) | |
| B22F 1/00 | (2006.01) | |
| B82Y 30/00 | (2011.01) | |
| B82Y 40/00 | (2011.01) | |
| C23C 22/60 | (2006.01) | |

(52) U.S. Cl.
CPC .............. *B22F 1/02* (2013.01); *B22F 1/0018* (2013.01); *B82B 3/00* (2013.01); *B82Y 30/00* (2013.01); *B82Y 40/00* (2013.01); *C23C 22/60* (2013.01); *B22F 2001/0033* (2013.01); *B22F 2302/40* (2013.01); *B22F 2302/45* (2013.01); *B22F 2998/10* (2013.01)

(58) Field of Classification Search
CPC .. B22F 1/02; B22F 1/0018; B22F 2001/0033; B22F 2302/40; B22F 2302/45; B22F 2998/10; B82B 3/00; B82Y 40/00; C23C 22/60; Y10T 428/2982

USPC ......................................................... 428/407
See application file for complete search history.

(56) References Cited

U.S. PATENT DOCUMENTS

| | | | | |
|---|---|---|---|---|
| 8,747,903 B2 * | 6/2014 | Hahn | ............... | A61K 47/48192 424/493 |
| 2013/0095187 A1 * | 4/2013 | Hahn | ............... | A61K 47/48192 424/493 |

FOREIGN PATENT DOCUMENTS

| | | | |
|---|---|---|---|
| KR | 10-1154159 | * | 6/2012 |
| KR | 10-1154159 B1 | | 6/2012 |
| KR | 10-2013-0019232 | * | 2/2013 |
| KR | 10-2013-0019232 A | | 2/2013 |
| KR | 10-1255149 | * | 4/2013 |
| KR | 10-1255149 B1 | | 4/2013 |
| KR | 10-1303285 B1 | | 9/2013 |
| KR | 10-1330227 | * | 11/2013 |
| KR | 10-1330227 B1 | | 11/2013 |
| KR | 10-1340022 | * | 12/2013 |
| KR | 10-1340022 B1 | | 12/2013 |

OTHER PUBLICATIONS

International Search Report from Corresponding Application No. PCT/KR2014/012731; dated Mar. 10, 2015.
Ku, Sook Hee, et al. "General functionalization route for cell adhesion on non-wetting surfaces." Biomaterials 31.9 (2010): 2535-2541.
Ryu, Ji Hyun, et al. "Catechol-functionalized chitosan/pluronic hydrogels for tissue adhesives and hemostatic materials." Biomacromolecules 12.7 (2011): 2653-2659.

* cited by examiner

*Primary Examiner* — Leszek Kiliman
(74) *Attorney, Agent, or Firm* — Pearne & Gordon LLP

(57) ABSTRACT

The present invention relates to a nanometal-flake graphite composite and a method of manufacturing the same, and more particularly, to a nanometal-flake graphite composite, in which nanometal-flake graphite, in which crystallized nanometal particles are highly densely bonded to the surface of flake graphite, is coated with polydopamine to form a polydopamine coating layer which significantly improves properties such as bonding properties between flake graphite basal planes, adhesiveness with other media, and dispersibility, and a method of manufacturing the nanometal-flake graphite composite.

11 Claims, 13 Drawing Sheets

[Fig. 1]
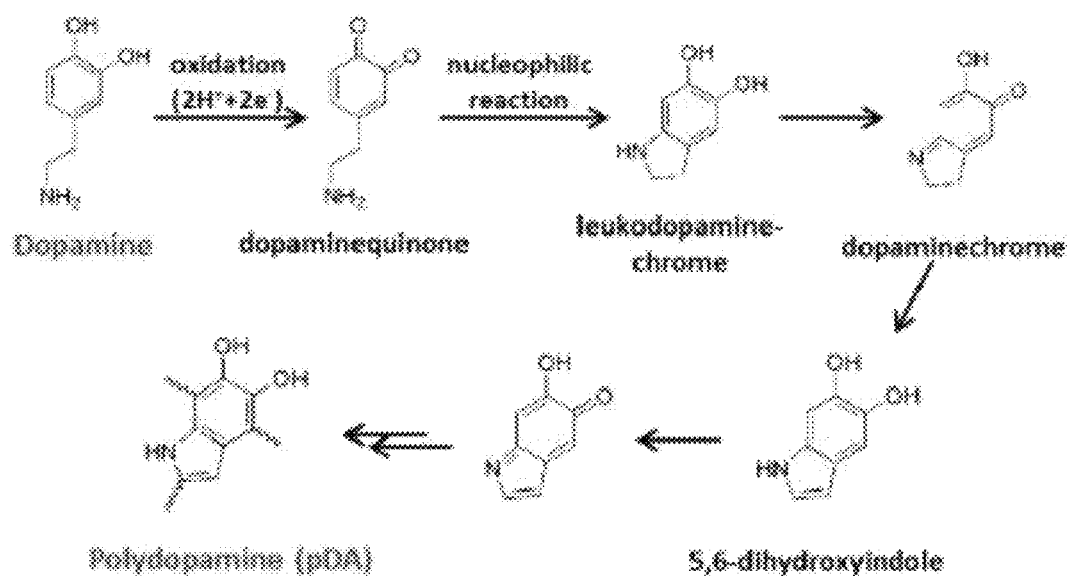

[Fig. 2]
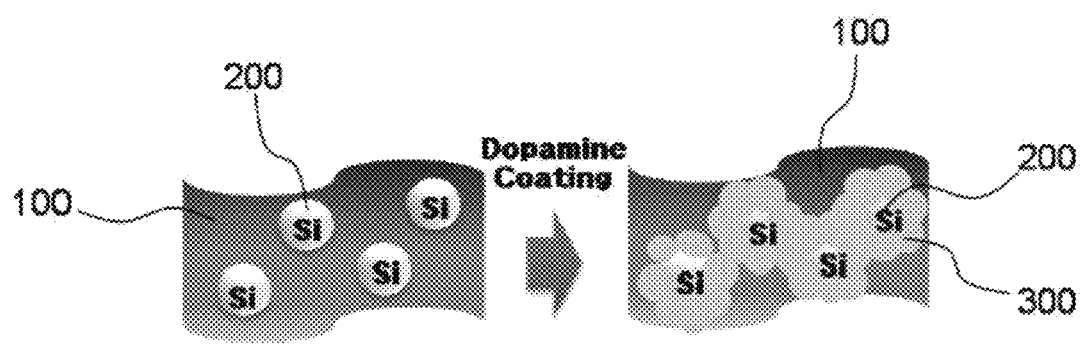

[Fig. 3]
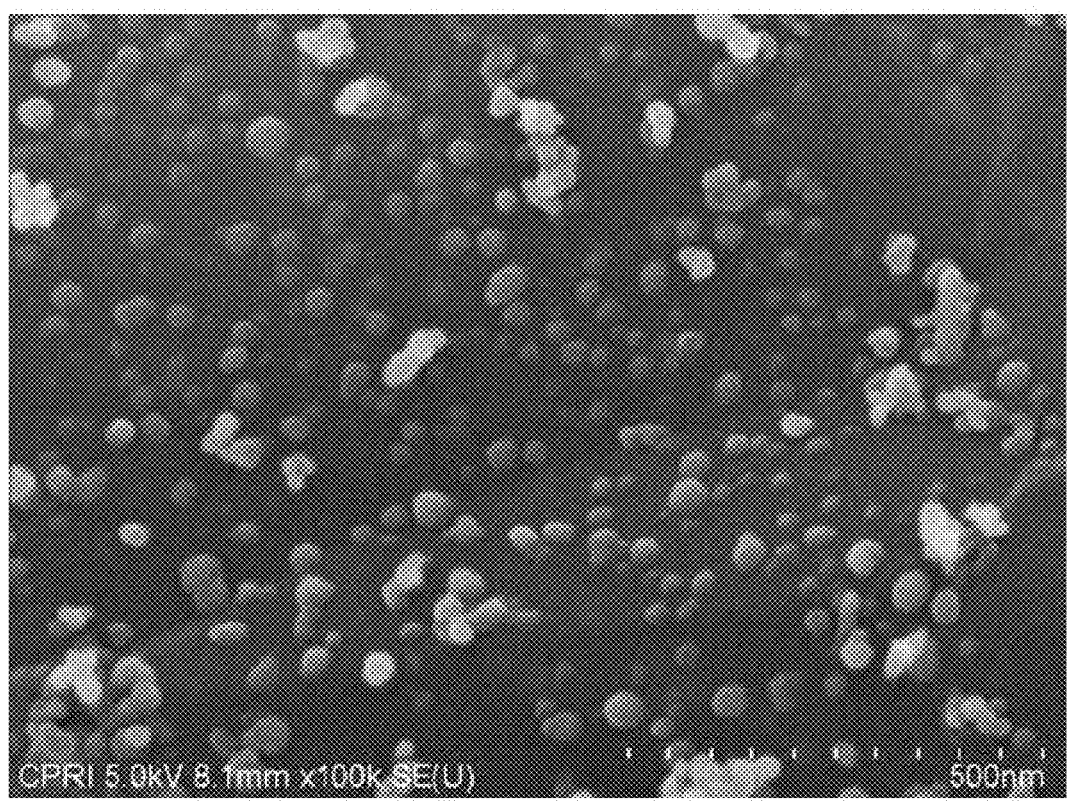

[Fig. 4]
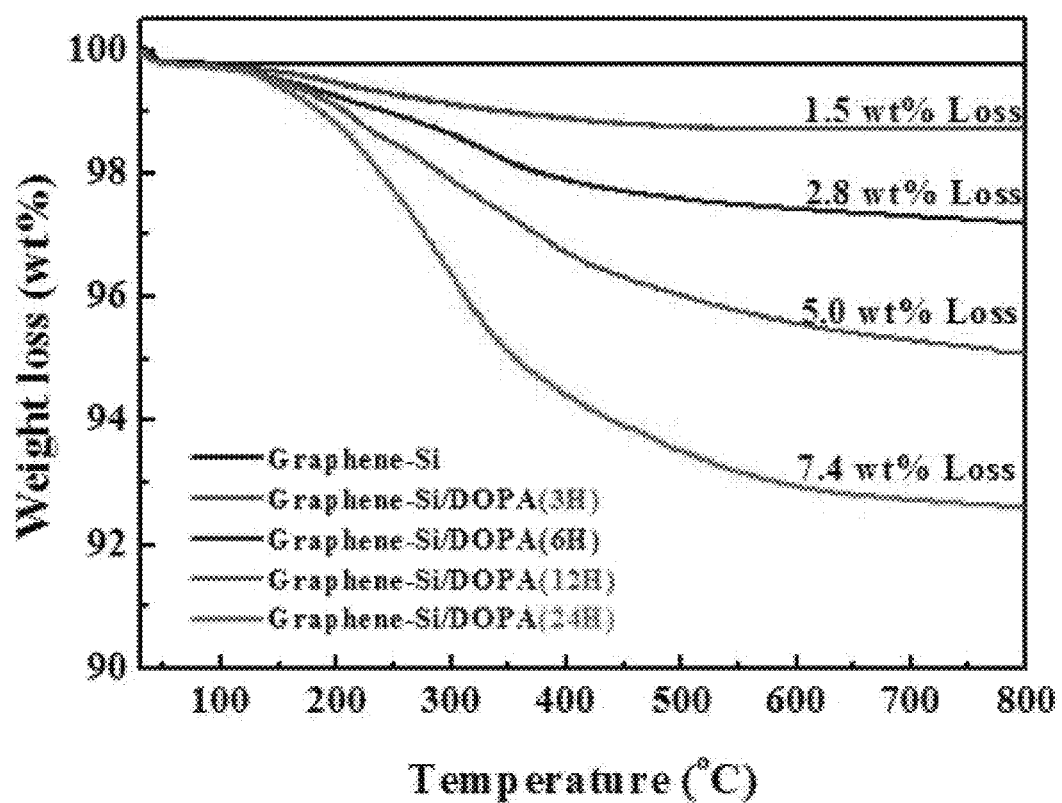

[Fig. 5]
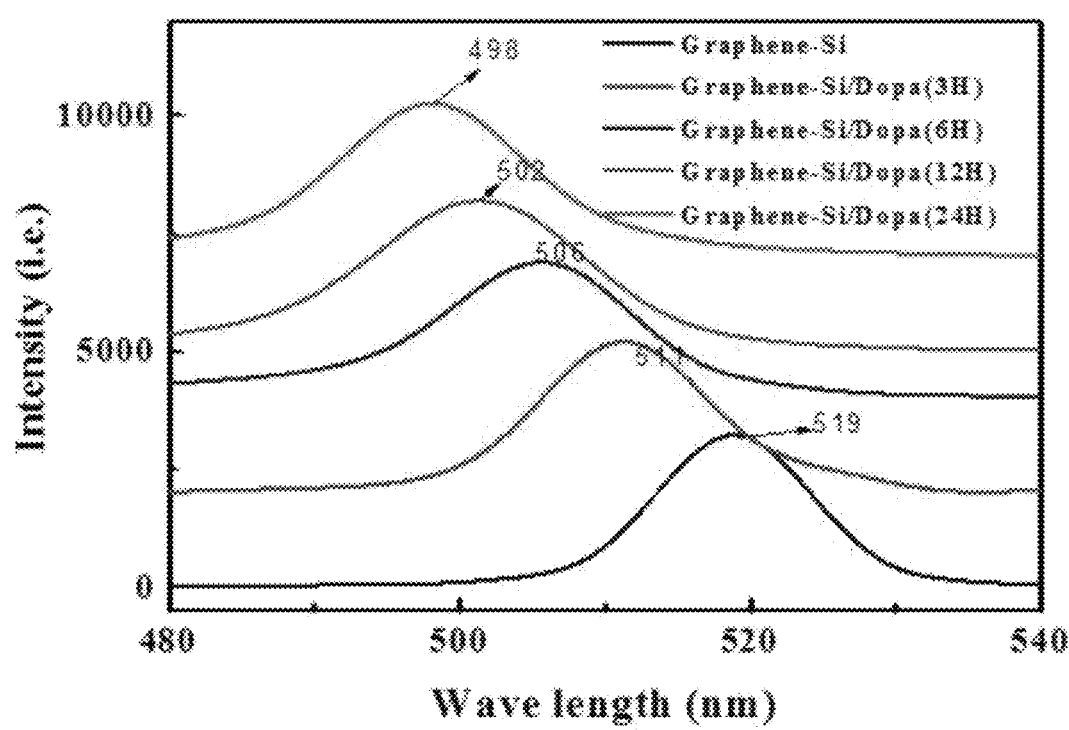

[Fig. 6]
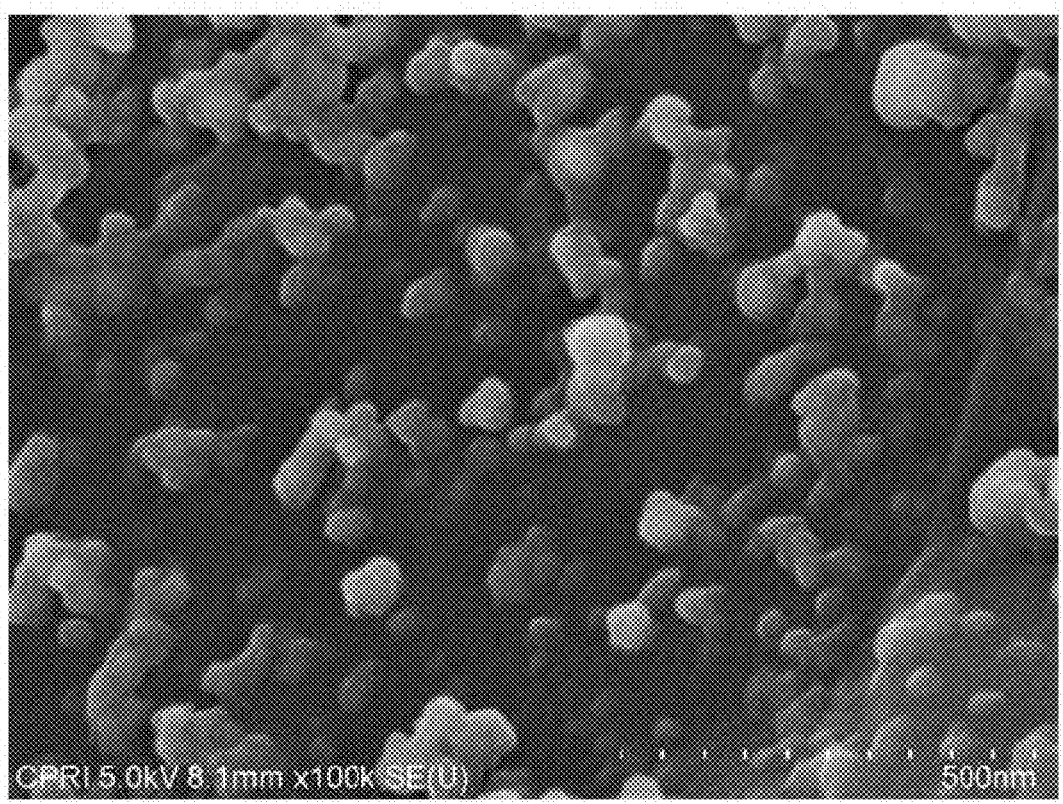

[Fig. 7]
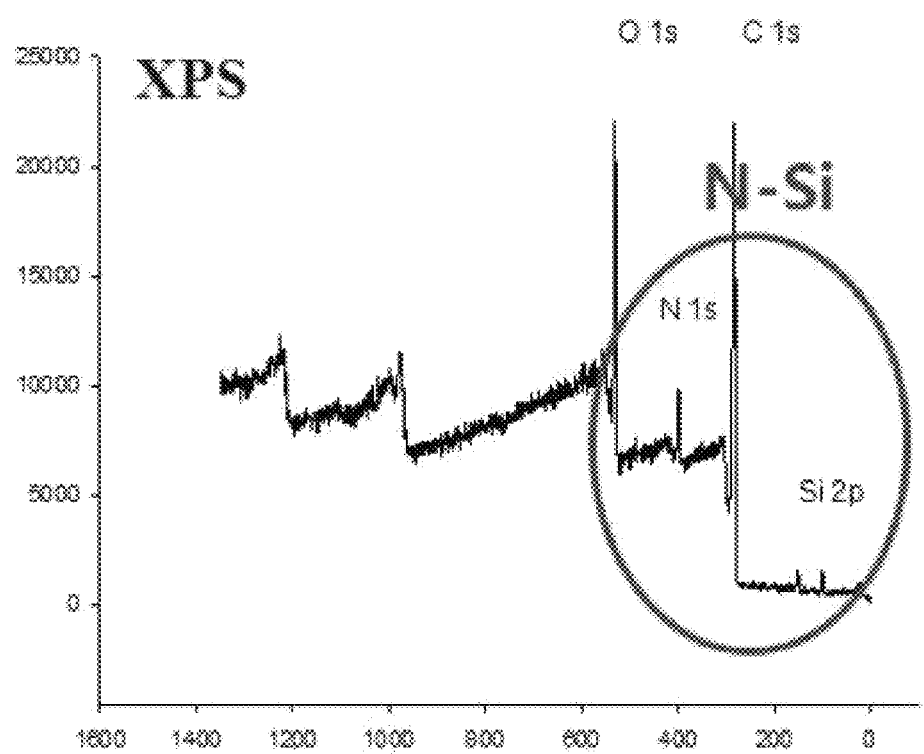

[Fig. 8]
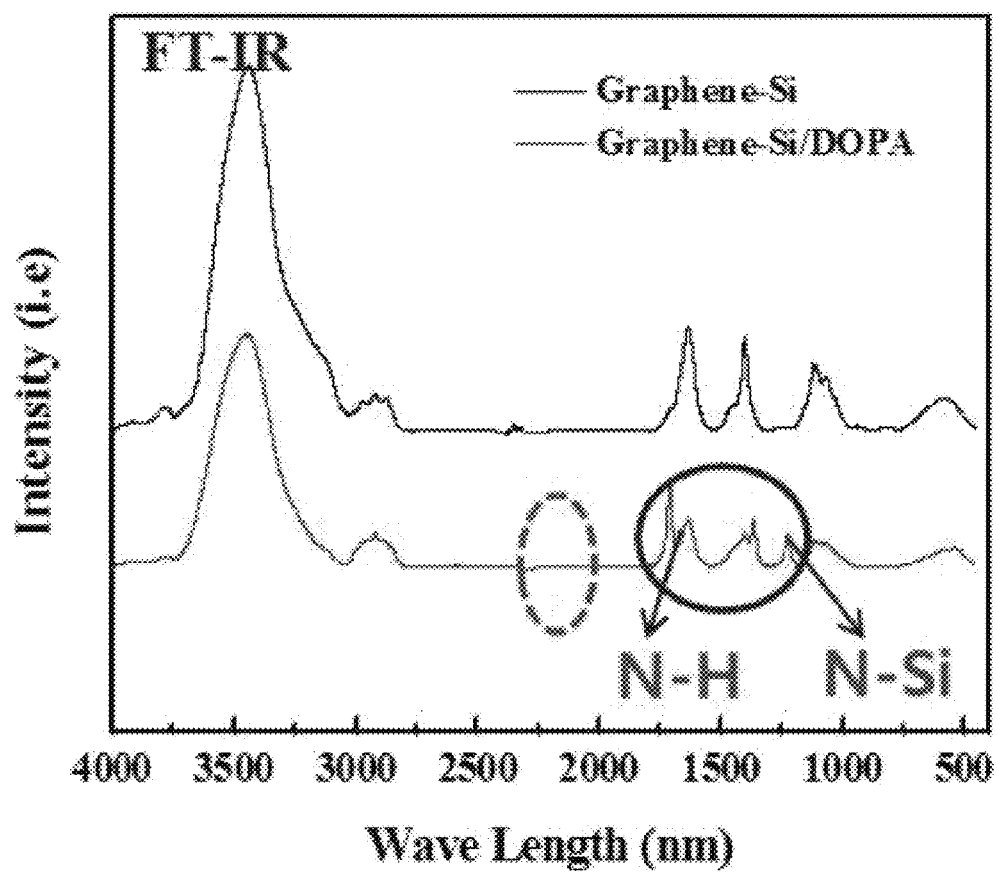

[Fig. 9a]
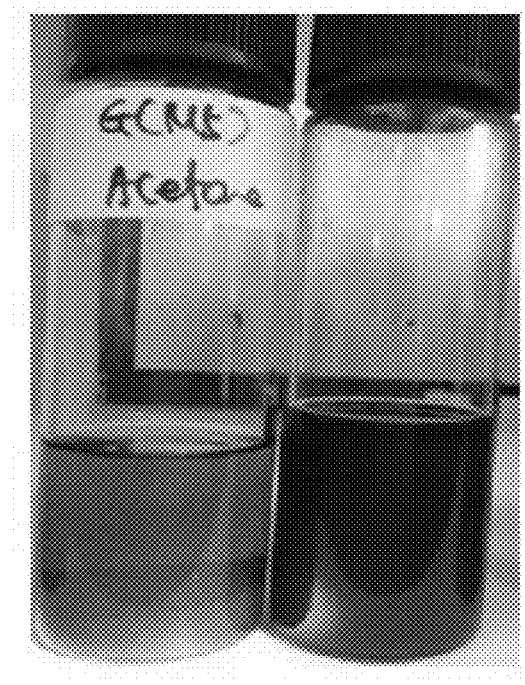

[Fig. 9b]

[Fig. 9c]
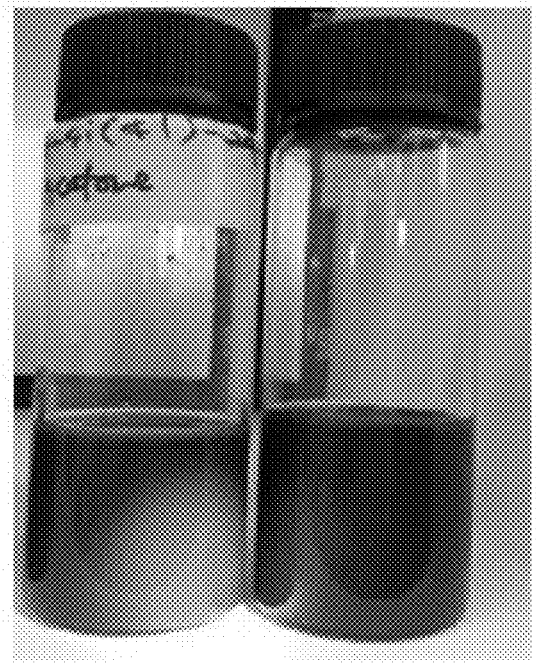

[Fig. 10]
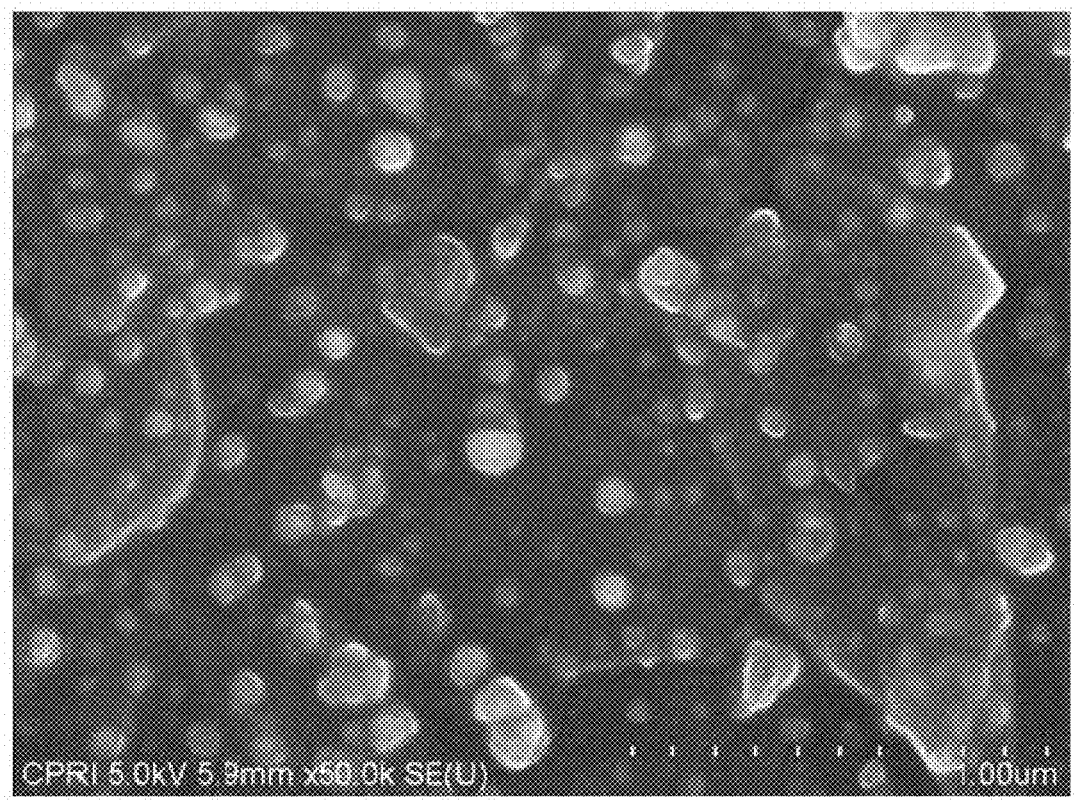

[Fig. 11]
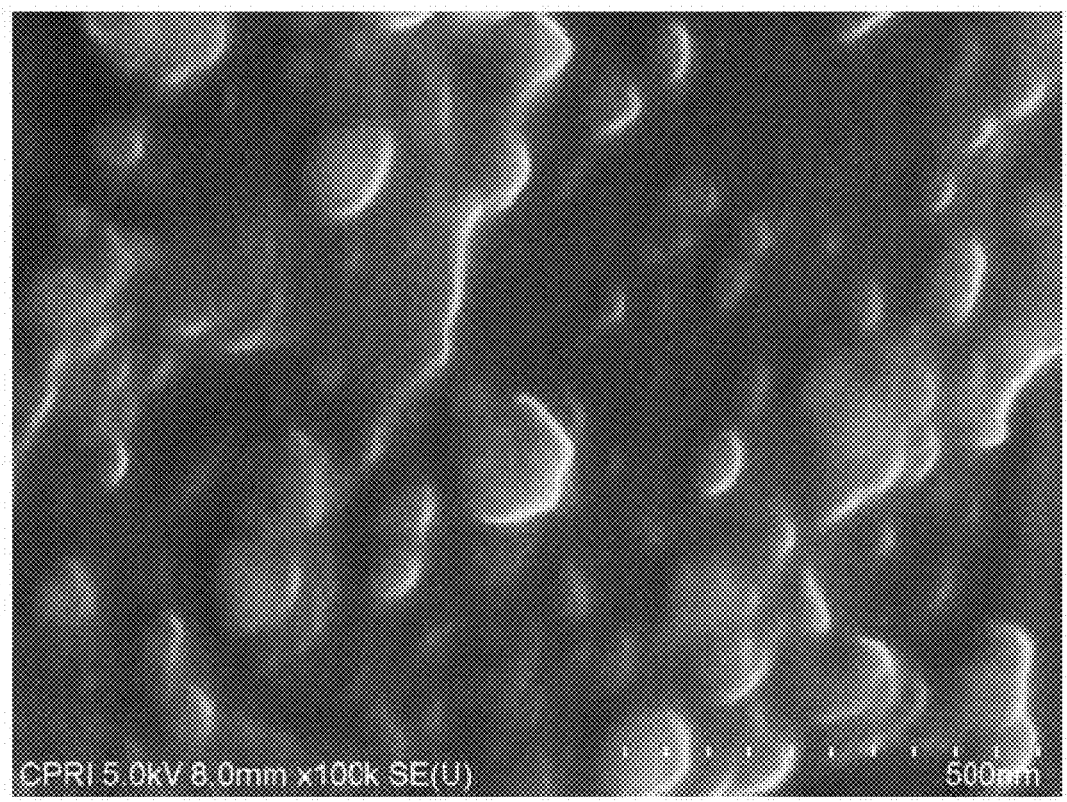

NANOMETAL-FLAKE-GRAPHITE COMPOSITE AND METHOD OF MANUFATURING THE SAME

CROSS-REFERENCE TO RELATED PATENT APPLICATION

This application claims the benefit of Korean Patent Application No. 10-2013-0164154, filed on Dec. 26, 2013, in the Korean Intellectual Property Office, the disclosure of which is incorporated herein in its entirety by reference.

BACKGROUND OF THE INVENTION

1. Field of the Invention

The present invention relates to a carbon-based material, for example, a nanometal-flake graphite composite including nanometal-flake graphite, in which crystallized nanometal particles are highly densely bonded to the surface of flake graphite, and a polydopamine coating layer, and more particularly, to a nanometal-flake graphite composite, in which properties, such as bonding properties between flake graphite basal planes, adhesiveness with other media, and dispersibility, are significantly improved by bonding polydopamine to the nanometal-flake graphite, and a method of manufacturing the nanometal-flake graphite composite.

2. Description of the Related Art

Recently, "polydopamine" mimicking adhesive proteins of mussels has received attention in various technical fields. Since the polydopamine is a mussel-inspired material, the polydopamine has excellent biocompatibility and may be coated on virtually all surfaces. Also, since the coating surface has activity, a new material may be introduced on the polydopamine coating. In a case in which polydopamine is introduced into various synthetic polymers/natural polymers, since these polymers also have adhesive and coating capabilities, these polymers are applied to various techniques.

Specifically, a study has been reported in which cell culture becomes possible on surfaces, such as those of polyethylene, silicon rubber, and polydimethylsiloxane (PDMS), on which cell adhesion is not possible, by introducing a polydopamine coating (S. H. Ku et al, Biomaterials 2010, 31, 2535), and an adhesive chitosan hydrogel is formed by introducing polydopamine into chitosan, as a natural polymer, which has been actively studied as a medical polymer and a hemostatic agent has been developed using the adhesive chitosan hydrogel (J. H. Ryu et al., Biomacromolecules 2011, 12, 2653). In addition, an adhesive polymer has been developed by introducing polydopamine into hyaluronic acid or polyethylene glycol (PEG), and thus, polydopamine has been variously used in medical/biotechnology industries, for example, biocompatible surface modification and hydrogel formation.

Applied research in the energy sector using polydopamine has recently received attention, wherein a study has also been reported in which adhesiveness is provided by introducing polydopamine into a polymer, such as alginic acid and polyacrylate, which is used as a binder of a lithium ion battery, to improve adhesion between the binder and an electrode, and thus, capacity and lifetime of the battery are significantly improved.

However, even with respect to the polydopamine having such excellent coating properties, bonding to pure flake graphite is not easy. The pure flake graphite has a very stable chemical structure itself due to the Van der Waals force between the flake graphite layers, and a bonding site is not present on a basal plane of the flake graphite but is present only at an edge or a defective part of the flake graphite. Thus, when coating of polydopamine is generally attempted on the pure flake graphite, only a portion of the edge and the defective part of the flake graphite is usually coated. Research into surface modification of the flake graphite or control of coating conditions has continued to address this issue.

The present inventors confirmed that, different from conventional flake graphite, coating properties of nanometal-flake graphite having a structure, in which nanoparticles are crystallized at a high density, with respect to polydopamine are excellent, thereby leading to the completion of the present invention.

SUMMARY OF THE INVENTION

The present invention provides a nanometal-flake graphite composite including nanometal-flake graphite, in which crystallized nanometal particles are highly densely bonded to the surface of flake graphite, and a polydopamine coating layer.

The present invention also provides a method of manufacturing the nanometal-flake graphite composite.

The technical objects of the present invention are not limited to those described above, and it will be apparent to those of ordinary skill in the art from the following description that the present invention includes other technical objects not specifically mentioned herein.

According to an aspect of the present invention, a nanometal-flake graphite composite according to the present invention includes nanometal-flake graphite, in which crystallized nanometal particles are highly densely bonded to the surface of flake graphite, is coated with polydopamine to form a polydopamine coating layer, and, in this case, the polydopamine may be coated on the nanometal-flake graphite by being deposited on the nanometal particles.

In this case, the polydopamine coating layer may have a thickness of 5 nm to 100 nm.

The nanometal-flake graphite composite, in which the polydopamine coating layer is formed, may further include a polymer resin which is bonded to the polydopamine coating layer, and the polymer resin may include at least one resin selected from the group consisting of an epoxy-based resin, a polyethylene-based resin, a polypropylene-based resin, a polystyrene-based resin, an acryl-based resin, a polyvinyl chloride-based resin, and a nylon-based resin.

According to another aspect of the present invention, a method of manufacturing the nanometal-flake graphite composite according to the present invention includes the steps of:

(a) preparing a weakly basic dopamine aqueous solution;

(b) dipping nanometal-flake graphite in the dopamine aqueous solution; and (c) forming a polydopamine coating layer on a surface of the nanometal-flake graphite.

In this case, a description of each configuration is the same as that described above.

In particular, in step (a), the weakly basic dopamine aqueous solution has a pH of 8 to 14, and the dopamine aqueous solution has a dopamine concentration of 0.1 mg/L to 5 mg/L. In step (b), the dipping may be performed for 0.5 hours to 24 hours or less.

Also, the method of the present invention may further include adding a polymer resin to be bonded to the polydopamine coating layer, and, in this case, the polymer resin and the polydopamine coating layer are bonded by a polymerization reaction.

BRIEF DESCRIPTION OF THE DRAWINGS

The above and other features and advantages of the present invention will become more apparent by describing in detail exemplary embodiments thereof with reference to the attached drawings in which:

FIG. 1 is a schematic view illustrating structural changes due to an oxidation reaction of dopamine and a resultant polydopamine formation step;

FIG. 2 is a schematic view illustrating a process in which a polydopamine coating layer is formed on nanometal-flake graphite of the present invention;

FIG. 3 illustrates the result of field-emission scanning electron microscope (FE-SEM) observation of nanosilicon (Si)-flake graphite prepared in Example 1-1;

FIG. 4 is a graph illustrating weight losses (%) which are measured by increasing the temperature of nanosilicon-flake graphite composites having different dipping times;

FIG. 5 is a graph illustrating analysis results of the nanosilicon-flake graphite composites having different dipping times which are obtained by spectroscopy;

FIG. 6 illustrates the result of FE-SEM observation of a nanosilicon-flake graphite composite prepared in Example 2-2;

FIGS. 7 and 8 illustrate analysis results of the nanosilicon-flake graphite composite prepared in Example 2-2 which are respectively obtained by using X-ray photoelectron spectroscopy (XPS) equipment and Fourier transform infrared spectroscopy (FT-IR) equipment;

FIGS. 9A, 9B, 9C illustrate results of the dispersion of conventional flake graphite, the nanosilicon-flake graphite prepared in Example 1-1, and the nanosilicon-flake graphite composite prepared in Example 2-2 in an organic solvent (acetone), respectively;

FIG. 10 illustrates the result of FE-SEM observation of a composite in which an epoxy-based polymer resin bonded to a polydopamine coating layer is further included; and FIG. 11 illustrates an enlarged view of the composite of FIG. 10.

DETAILED DESCRIPTION OF THE INVENTION

Hereinafter, preferred embodiments will be described in more detail with reference to the accompanying drawings. Moreover, detailed descriptions of well-known functions or configurations will be omitted in order not to unnecessarily obscure the focus of the present invention.

An embodiment of the present invention is related to a nanometal-flake graphite composite that is characterized in that nanometal-flake graphite, in which crystallized nanometal particles are highly densely bonded to the surface of flake graphite, is coated with polydopamine to form a polydopamine coating layer.

In this case, the polydopamine may be coated on the nanometal-flake graphite by being deposited on the crystallized nanometal particles, and the polydopamine coating layer may have a thickness of 5 nm to 100 nm.

The nanometal-flake graphite composite having the polydopamine coating layer formed thereon may further include a polymer resin which is bonded to the polydopamine coating layer, and the polymer resin may include at least one resin selected from the group consisting of an epoxy-based resin, a polyethylene-based resin, a polypropylene-based resin, a polystyrene-based resin, an acryl-based resin, a polyvinyl chloride-based resin, and a nylon-based resin.

According to another embodiment of the present invention, provided is a method of manufacturing the nanometal-flake graphite composite including the steps of:

(a) preparing a weakly basic dopamine aqueous solution;

(b) dipping nanometal-flake graphite in the dopamine aqueous solution; and (c) forming a polydopamine coating layer on a surface of the nanometal-flake graphite.

In this case, a description of each configuration is the same as that described above.

In particular, in step (a), the weakly basic dopamine aqueous solution has a pH of 8 to 14, and the dopamine aqueous solution has a dopamine concentration of 0.1 mg/L to 5 mg/L. In step (b), the dipping may be performed for 0.5 hours to 24 hours or less.

Hereinafter, the present invention will be described in detail.

Since a nano-functional material is directly in contact with a tissue by being inserted into a human body, the nano-functional material must have biological and chemical affinity as well as mechanical affinity with the human body, and it depends entirely on surface properties of the material. Thus, in order to apply biotechnology to the nanomaterial, surface modification and coating techniques of the biocompatible functional nanomaterial are important.

Until now, a decrease in chemical reactivity in a basal plane of flake graphite has been regarded as a major issue in relation to the use of the flake graphite. A binding site capable of being subjected to a chemical reaction is not present on the basal plane of prefect flake graphite, but the binding sites are present at an edge of the flake graphite and a defective part of the flake graphite basal plane, wherein the chemical reactivity of the basal plane of the flake graphite is lower than those of the edge and defective part of the flake graphite due to the binding sites capable of being subjected to a chemical reaction.

For this reason, in a case in which pure flake graphite is generally dispersed in a polymer resin, there is a limitation in that the pure flake graphite is not well dispersed because it is difficult to form a strong interfacial bond with the polymer resin, and thus, there is an attempt to use polydopamine having an excellent compatibility with a medium in order to address the limitation.

Polydopamine is an adhesive polymer that mimics adhesive proteins of mussels, wherein the polydopamine is generally formed by a spontaneous polymerization reaction of dopamine, as one of neurotransmitters derived from a structure of lysine and 3,4-dihydroxy-L-phenylalanine (DOPA) which are frequently found in Mefp-5 as a protein related to the adhesion of the mussel, under basic oxidative conditions, and is a material which has recently been spotlighted as a component of a composite material, because adhesion to the surfaces of various materials is excellent.

However, since the pure flake graphite has a low adhesion to the polydopamine, the pure flake graphite is difficult to be coated with the polydopamine, and the improvement of the adhesion is limited even in a case in which the surface of the flake graphite is modified by an oxidized functional group. Thus, there is a need to develop a new method for significantly increasing the adhesion to the polydopamine.

Nanometal-Flake graphite Composite

In one aspect, the present invention is related to a nanometal-plate-shaped composite which includes nanometal-flake graphite, in which crystallized nanometal particles are highly densely bonded to the surface of flake graphite, and a polydopamine coating layer.

The "nanometal-flake graphite" is composed of a nanometal-flake graphite fused body in which crystallized nanometal particles are uniformly crystallized at a high density on the surface of the flake graphite as a carbon-based material, and, particularly, a large amount of the nanometal particles, from 20 wt % to 50 wt %, is contained.

Graphite is a mineral in which planar macromolecules, in which 6-membered rings of carbon atoms are infinitely connected on a plane, form layers and stacked, wherein the graphite is composed of a basic element, so-called "graphene". The graphene is a single planar sheet of sp2-bonded carbon atoms that are densely packed in a honeycomb crystal lattice, wherein a carbon-carbon bond length in the graphene is about 0.142 nm and is a basic structural element of some carbon allotropes including graphite, carbon nanotubes, carbon fibers, and fullerenes. The graphite may be one of amorphous graphite, crystalline graphite, expanded graphite in which the crystalline graphite is expanded, or spheroidal graphite in which the crystalline graphite is spheroidized.

"Flake graphite" denotes thin plate-like graphite and is a single planar sheet of sp2-bonded carbon atoms that are densely packed in a honeycomb crystal lattice generally, wherein a carbon-carbon bond length in the flake graphite is about 0.142 nm and is a basic structural element of some carbon allotropes including graphite, carbon nanotubes, and fullerenes. The flake graphite of the present invention includes such a single-layered carbon sheet and a layered structure in which the single-layered carbon sheets are stacked, and further includes a material which exists as a part of a material capable of including a graphite layer, a carbon layer, and a carbon sheet. That is, the expression "flake graphite" is used as an abbreviation which stands for flake graphite, a flake graphite derivative, functionalized flake graphite, or a combination thereof.

The flake graphite usable in the present invention may be obtained by various methods known in the art. For example, there is a method of preparing flake graphite in a single crystalline state by preparing a thermosetting resin, such as polyimide, in the form of a film having a thickness of 25 μm or less and graphitizing the resin at a temperature of 2,500° C. or more, or a method of obtaining highly oriented graphite by chemical vapor deposition (CVD) in which hydrocarbon, such as methane, is pyrolyzed at a high temperature.

Also, the nanometal particles used in the nanometal-flake graphite composite may be a metallic material which exists as a solid at room temperature and, for example, may be selected from alkali metals, alkaline earth metals, lanthanides, actinides, transition metals, post-transition metals, and metalloids in the Periodic Table. Preferably, the nanometal particles, as a metallic material, may include alkali metals, alkaline earth metals, lanthanides, actinides, or transition metals. For example, the nanometal particles may be selected from nickel (Ni), silicon (Si), titanium (Ti), chromium (Cr), manganese (Mn), iron (Fe), cobalt (Co), copper (Cu), tin (Sn), indium (In), platinum (Pt), gold (Au), magnesium (Mg), and a combination thereof, and may be particularly Cu, Ni, or Si. The preparation of the nanomaterial (nanoparticle)-flake graphite fused body may be referred to Korean Patent 10-1330227.

The nanometal-flake graphite composite of the present invention is characterized in that, in the nanometal-flake graphite, the nanometal particles are contained in an amount of 10 wt % to 50 wt %, for example, 20 wt % to 50 wt %, based on total flake graphite, and are crystallized at a "high density" while having a surface coverage of 30% to 40%, 30% to 50%, 30% to 60%, or 30% to 70%.

Particularly, the crystallized nanometal particles may not only have a density about 100 times higher than that of a conventional nanometal-flake graphite fused body on the surface of the flake graphite, but may also form a bond such as a chemical bond.

Also, the nanometal-flake graphite of the present invention has characteristics in which a crystal formed of the nanometal particles on the surface of the flake graphite has a large size. The crystal formed of the nanometal particles may have an average particle diameter of 10 nm to 200 nm, 20 nm to 200 nm, 30 nm to 200 nm, 40 nm to 200 nm, 50 nm to 200 nm, 60 nm to 200 nm, 70 nm to 200 nm, 80 nm to 200 nm, 90 nm to 200 nm, or 100 nm to 200 nm. Since contact properties are improved due to the nanometal crystal, contact resistance may be reduced to improve thermal or electrical properties.

In the nanometal-flake graphite composite of the present invention, a surface-modified composite is obtained by using catecholamine, most preferably, dopamine.

The term "catecholamine" denotes a single molecule which has a hydroxyl group (—OH), as an ortho-group of a benzene ring, and various alkyl amines as a para-group, and dopamine, dopamine-quinone, alpha-methyldopamine, and alphamethyldopa are included as various derivatives of the above structure. Most preferably, dopamine is used.

"Dopamine", as one of neurotransmitters secreted by nerve endings, is a very important material in which about a half of neurohormones produced in the brain is related to the dopamine, wherein a functional surface modification technique using dopamine, as a single molecular material composed of catechol which is an important chemical functional group exhibiting adhesion in the adhesive proteins of mussels, has published in 2007.

FIG. 1 is a schematic view illustrating structural changes due to an oxidation reaction of dopamine and a resultant polydopamine formation step, as an example of the present invention.

Dopamine is a single molecular material with a molecular weight of 153 (Da) which has catechol and an amine functional group, wherein it is known that when a material to be surface modified is put in a dopamine aqueous solution under the same basic pH condition (pH of about 8.5) as an ocean environment and taken out after a certain period of time, a polydopamine (PDA) coating layer is formed on the surface of the material due to the oxidation of the catechol.

The polydopamine coating is bio-inspired surface modification which is introduced by understanding an adhesion mechanism of mussels identified from previous research and selectively mimicking only an important chemical functional group therefrom, wherein, similar to a case in which the mussels have adhesion to various surfaces in an underwater environment, the polydopamine coating also exhibits excellent surface adhesion ability to various surfaces under the condition of aqueous solution regardless of chemical properties of the surface.

The following Formula 1 is a basic structure of a mussel-derived polydopamine polymer according to the present invention.

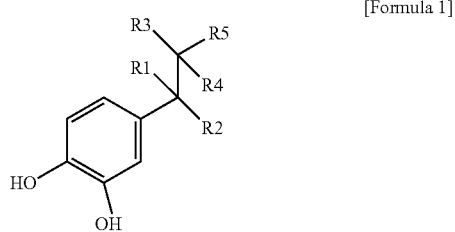

[Formula 1]

In Formula 1, at least one of $R_1$, $R_2$, $R_3$, $R_4$, and $R_5$ may be one selected from the group consisting of thiol, primary amine, secondary amine, nitrile, aldehyde, imidazole, azide, halide, polyhexamethylene dithiocarbonate, hydroxyl, carboxylic acid, carboxylic ester, or carboxamide, and, in this case, the others may be hydrogen.

In the present invention, dopamine is self-polymerized on the nanometal-flake graphite to form a coating layer formed of polydopamine as in Formula 1.

FIG. 2 is a schematic view illustrating a process in which a polydopamine coating layer is formed on the nanometal-flake graphite of the present invention, wherein the coating layer is difficult to be formed on a basal plane of pure flake graphite, but since the crystallized nanometal particles are highly densely bonded to the surface of the nanometal-flake graphite of the present invention, polydopamine is bonded to the "crystallized nanometal particles" to form a coating layer, and thus, a nanometal-flake graphite composite may be formed.

Also, in the composite of the present invention, the polydopamine coating layer may have a thickness of 3 nm to 100 nm, 5 nm to 100 nm, 5 nm to 90 nm, 5 nm to 80 nm, 5 nm to 70 nm, 5 nm to 60 nm, or, for example, 5 nm to 50 nm.

Since the nanometal-flake graphite composite of the present invention ensures excellent coating properties and dispersibility due to the polydopamine coating layer, the nanometal-flake graphite composite may adhere to various materials or may exhibit excellent dispersibility in the medium.

In contrast, with respect to conventionally known pure flake graphite, it is difficult to form a polydopamine coating layer on a basal plane of the flake graphite to such a degree that it is difficult to confirm whether polydopamine coating is performed or not even if the polydopamine coating is performed.

However, with respect to the nanometal-flake graphite of the present invention, since the nanometal particles are bonded to the surface of the flake graphite, the above limitations are addressed.

Also, since the polydopamine coating itself has a reducing power and an amine functional group simultaneously forms a covalent bond with a catechol functional group on the surface by a Michael addition reaction, secondary surface modification using the polydopamine coating layer as an adhesive is possible. Research into immobilization of various biomaterials, such as proteins, biopolymers, and polysaccharides, on the surface by using the chemical reactivity and application thereof is in progress while receiving a lot of attention.

In addition, the composite of the present invention may be used as a polymer reinforcement, wherein since conventional pure flake graphite itself has a very stable chemical structure due to the Van der Waals force between flake graphite layers, uniform dispersion of the conventional pure flake graphite in a polymer resin and an organic solvent has been difficult.

However, since the composite of the present invention includes a polydopamine coating layer which is easily bonded to a polymer resin, a uniform dispersion phase may be formed.

Herein, the polydopamine coating layer acts as a medium which bonds the nanometal-flake graphite and the polymer resin, and, for this reason, the composite may further include a polymer resin which is bonded to the polydopamine coating layer.

The polymer resin is not particularly limited in terms of the type thereof, but may be selected from the group consisting of a thermosetting resin and a thermoplastic resin. The thermosetting resin is not particularly limited in terms of the type thereof, but may be an epoxy-based resin, an urethane-based resin, a melamine-based resin, a polyimide-based resin, and a mixture thereof, and the thermoplastic resin is also not particularly limited in terms of the type thereof, but may be a polycarbonate-based resin, a polystyrene-based resin, a polysulfone-based resin, a polyvinyl chloride-based resin, a polyether-based resin, a polyacrylate-based resin, a polyester-based resin, a polyamide-based resin, a cellulose-based resin, a polyolefin-based resin, a polypropylene-based resin, and a mixture thereof.

In this case, the polymer resin and the polydopamine coating layer are bonded by a polymerization reaction.

The nanometal-flake graphite composite of the present invention having the above-described configuration may have the following advantages.

(1) Since strong adhesion with the polymer resin or various materials may be obtained as the polydopamine coating layer is formed on the surface of the nanometal-flake graphite, dispersibility and bondability may be effectively improved.

(2) Since various composite materials in addition to the polymer resin may be added to form a uniform dispersion phase due to the excellent bondability of the polydopamine, physical properties of the material may be effectively improved.

Method of Manufacturing Nanometal-Flake graphite Composite

The nanometal-flake graphite composite of the present invention may be manufactured by a liquid-phase method, such as typical dip coating, using self-polymerization of dopamine.

Thus, in another aspect, the present invention relates to a method of manufacturing a nanometal-flake graphite composite including a polydopamine coating layer.

An embodiment of the present invention may provide a method of manufacturing a nanometal-flake graphite composite including the following steps.

(a) preparing a weakly basic dopamine aqueous solution and nanometal-flake graphite;

(b) dipping the nanometal-flake graphite in the weakly basic dopamine aqueous solution; and (c) forming a polydopamine coating layer on a surface of the nanometal-flake graphite.

In step (a), a method of preparing the weakly basic dopamine aqueous solution is not particularly limited, but the weakly basic dopamine aqueous solution may be prepared by dissolving polydopamine in a basic Tris buffer solution (10 ml) having a pH of 8 to 14, for example, a basic Tris buffer solution having a pH of 8.5 which is the same condition as an ocean environment, and, in this case, the weakly basic dopamine aqueous solution has a dopamine concentration of 0.1 mg/mL to 5 mg/mL, for example, 2 mg/mL.

A method of manufacturing nanometal-flake graphite flakes may be referred to Korean Patent Application No. 10-2012-69905.

The nanometal used is a metallic material which exists as a solid at room temperature, wherein the nanometal may be selected from any one of alkali metals, alkaline earth metals, lanthanides, actinides, transition metals, post-transition metals, and metalloids in the Periodic Table, and used. For example, Ni, Si, Ti, Cr, Mn, Fe, Co, Cu, Sn, In, Pt, Au, Mg, and a combination thereof are used. The nanometal is mixed with flake graphite to prepare mixed powder. In this case, a mixing ratio of the nanometallic material to the flake graphite may be arbitrarily set depending on the purpose of use, but, in the present invention, since the nanomaterial is present at a high density on the surface of the flake graphite, preferably, the nanomaterial may be mixed to be contained in an amount of 20 wt % to 50 wt % based on a total weight. In particular, a high-frequency thermal plasma is used to evaporate the nanomaterial included in the mixed powder. A quenching gas is used to crystallize the evaporated nanomaterial on the surface of the flake graphite. That is, since the evaporated nanomaterial is condensed or quenched by the quenching gas, the evaporated nanomaterial is nanocrystallized while suppressing the growth of nanoparticles.

According to the above-described method, the nanometal-flake graphite of the present invention may be obtained in which the nanomaterial is contained in an amount of 20 wt % to 50 wt % based on the total flake graphite, constitutes a crystal having an average particle diameter of 10 nm to 200 nm, and has a surface coverage of 30% to 70% of a nanometal-flake graphite fused body.

In step (b), the nanometal-flake graphite is dipped in the weakly basic dopamine aqueous solution, and, in step (c), the polydopamine coating layer is formed on the surface of the nanometal-flake graphite.

In the present invention, a dip coating method, one of liquid coating methods, is used. The dip coating method is one kind of coating methods, wherein it denotes a method in which a coating object is generally dipped in a coating solution to form a precursor layer on the surface of the coating object and then coated by being sintered at an appropriate temperature.

However, in the present invention, since dopamine is subjected to a spontaneous polymerization reaction under basic and oxidation conditions to form a polydopamine coating layer on the surface of the nanometal-flake graphite flake, a separate sintering process is not necessary, and, although the addition of an oxidizer is not particularly limited, oxygen gas in the air may be used as an oxidizer without the addition of the oxidizer.

Dipping time determines a thickness of the coating layer, wherein, in a case in which a dopamine aqueous solution, which is prepared by dissolving dopamine in a basic Tris buffer solution having a pH of 8 to 14 to have a dopamine concentration of 0.1 mg/mL to 5 mg/mL, is used, preferably, the nanometal-flake graphite may be dipped for about 0.5 hours to about 24 hours to form a coating layer to a thickness of 5 nm to 100 nm.

A dopamine coating layer is not formed on the surface of pure flake graphite even if the pure flake graphite is dipped in the weakly basic dopamine aqueous solution, but since the crystallized nanometal particles are present on the surface of the nanometal-flake graphite of the present invention to allow polydopamine to be bonded with the nanometal particles, a polydopamine coating layer is formed.

Since the nanometal-flake graphite composite manufactured by the above method includes a polydopamine coating layer having excellent adhesiveness, the nanometal-flake graphite composite may be further bonded to various materials such as polymers, biopolymers, and proteins. That is, since the polydopamine coating layer formed on the surface of the nanometal-flake graphite also has a catechol functional group having excellent chemical bonding properties as it is, secondary surface modification using the polydopamine coating layer is possible.

In particular, a polymerization reaction is performed by adding a polymer resin to chemically bond the polydopamine coating layer to the polymer resin, and thus, a composite further including the polymer resin may also be manufactured. Specific types of the polymer resin are as described above.

EXAMPLES

Hereinafter, the present invention will be explained in more detail by way of exemplary embodiments. These embodiments are intended to only illustrate the present invention, and it will be obvious to those skilled in the art that the scope of the present invention is not construed as being limited to these embodiments.

Example 1

Nanosilicon (Si)-Flake Graphite Preparation 1-1 Preparation of Nanosilicon-Flake graphite Flake graphite and silicon (Si) powder were mixed for 10 minutes by using a mixer to prepare raw material powder, and nanosilicon-flake graphite was prepared by a method similar to the method disclosed in Korean Patent Application No. 10-2012-69905.

1-2. FE-SEM Image Observation

FIG. 3 illustrates the result of field-emission scanning electron microscope (FE-SEM) observation of the nanosilicon (Si)-flake graphite prepared in Example 1-1. According to the result of the FE-SEM image observation, it may be observed that crystallized Si nanoparticles were well fused at a high density on the surface of the flake graphite.

Example 2

Manufacture and Analysis of Nanosilicon (Si)-Flake graphite Composite 2-1 Preparation of Weakly Basic Dopamine Aqueous Solution 2 mg of dopamine was dissolved in a 10 mM Tris buffer solution to prepare a weakly basic dopamine aqueous solution having a pH of 8.5.

2-2 Polydopamine Coating

The nanosilicon-flake graphite prepared in Example 1-1 was dipped in the weakly basic dopamine aqueous solution to form a polydopamine coating layer on the nanosilicon-flake graphite through a spontaneous polymerization reaction and the deposition of high-density crystallized nanosilicon on the flake graphite and thus, nanosilicon-flake graphite composites were formed.

FIG. 4 is a graph illustrating weight losses (%) which were measured by increasing the temperature of the nanosilicon-flake graphite composites having different dipping times. Specifically, the temperatures of nanosilicon-flake graphite flakes, which were not dipped in the dopamine aqueous solution, and the nanosilicon-flake graphite composites respectively dipped for 3, 6, 12, and 24 hours to form the polydopamine coating layer were increased to about 800° C. to measure weight losses of the composites.

As illustrated in FIG. 4, the weight loss of the undipped nanosilicon-flake graphite was hardly measured, and the weight losses of the nanosilicon-flake graphite composites, in which the polydopamine coating layers were formed by dipping, were increased as the dipping time increased, wherein the reason for this is that since the amount of the coated polydopamine and the thickness of the polydopamine coating layer were increased as the dipping time increased, a larger amount of the polydopamine, which was weak in a high-temperature environment, was decomposed due to the increase in the temperature.

FIG. 5 is a graph illustrating analysis results of the nanosilicon-flake graphite composites having different dipping times which were obtained by spectroscopy. As illustrated in FIG. 5, higher intensity was measured as the dipping time increased, and the results were consistent with the result of FIG. 2.

2-3 FE-SEM Image Observation

FIG. 6 illustrates the result of FE-SEM observation of the nanosilicon-flake graphite composite prepared in Example 2-2. According to the result of the FE-SEM observation, it may be confirmed that polydopamine was not deposited on the surface of the nanosilicon-flake graphite, but was deposited on the crystallized nanometal particles.

That is, with respect to conventional flake graphite having unmodified surfaces, it was not easy to form a coating layer on its surface due to low adhesion to polydopamine, but, since the flake graphite of the present invention had the surface modified with the crystallized nanometal particles, the polydopamine coating layer may be formed on the surface thereof.

2-4 XPS and FT-IR Analyses

FIGS. 7 and 8 illustrate analysis results of the nanosilicon-flake graphite composite prepared in Example 2-2 which were respectively obtained by using X-ray photoelectron spectroscopy (XPS) equipment and Fourier transform infrared spectroscopy (FT-IR) equipment.

As illustrated in FIG. 7, since nanosilicon particles were highly densely bonded to the surface of the flake graphite, a Si peak was observed and it was confirmed that C, N, and O elemental peaks corresponding to an elemental composition of polydopamine, as a surface coating material, were very high. Thus, it may be confirmed that the polydopamine coating layer was formed to a thickness of 10 μm or more, a measurement range of the XPS equipment, by the method of manufacturing a composite according to the present invention.

As illustrated in FIG. 8, aromatic N—C and N═C peaks were not observed at about 2200 nm corresponding to a direct bond between the surface of the flake graphite and the polydopamine, but an N—H peak and an N—Si peak were observed. Thus, it may be understood that this result was consistent with the FE-SEM image result of Example 2-3.

2-5 Dispersibility Evaluation

FIGS. 9A, 9B, 9C illustrate results of the dispersion of conventional flake graphite (FIG. 9A), the nanosilicon-flake graphite prepared in Example 1-1 (FIG. 9B), and the nanosilicon-flake graphite composite prepared in Example 2-2 (FIG. 9C) in an organic solvent (acetone), respectively.

As illustrated in the drawings, since the dispersibility of the conventional flake graphite was low, the conventional flake graphite was slightly transparent in the organic solvent (FIG. 9A). In contrast, since the composite of the present invention included the polydopamine coating layer having excellent adhesion and dispersibility, it may be confirmed that a uniformly dispersed phase was formed (FIG. 9C).

2-6 Bond to Polymer Resin

An epoxy-based polymer resin was added to the nanosilicon-flake graphite composite prepared in Example 2-2 to be bonded to the polydopamine coating layer of the composite.

FIG. 10 illustrates the result of FE-SEM observation of the composite in which the epoxy-based polymer resin bonded to the polydopamine coating layer was further included, and FIG. 11 illustrates an enlarged view of the composite of FIG. 10.

As illustrated in FIGS. 10 and 11, it may be confirmed that the polydopamine coating layer of the nanosilicon-flake graphite composite and the epoxy-based polymer resin were bonded through a polymerization reaction to form a strong fusion.

The present invention relates to a nanometal-flake graphite composite including nanometal-flake graphite, in which crystallized nanometal particles are highly densely bonded to the surface of flake graphite, and a polydopamine coating layer, and the nanometal-flake graphite composite may be suitable for electronic components, energy storage media, organic solar cells, and biomimetic devices by using properties of dopamine which exhibit excellent adhesiveness and coatability with respect to virtually all surfaces.

Although the present invention has been described with reference to the limited example and drawings, the present invention is not limited thereto and those skilled in the art will appreciate that various modifications and variations are possible, without departing from the scope and spirit of the invention. Thus, the scope of the present invention should be defined by the accompanying claims and all technical spirits of equivalents thereof should be interpreted as being included in the scope of the present invention.

Throughout the specification, unless the context demands otherwise, the terms "comprise" and "comprising" will be understood to imply the inclusion of a stated step or element, or group of steps or elements, but not to the exclusion of any other step or element, or group of steps or elements.

INDUSTRIAL APPLICABILITY

The present invention relates to a nanometal-flake graphite composite including nanometal-flake graphite, in which crystallized nanometal particles are highly densely bonded to the surface of flake graphite, and a polydopamine coating layer, and the nanometal-flake graphite composite may be suitable for electronic components, energy storage media, organic solar cells, and biomimetic devices by using properties of dopamine which exhibit excellent adhesiveness and coatability with respect to virtually all surfaces.

What is claimed is:

1. A nanometal-flake graphite composite comprising:
   nanometal-flake graphite in which crystallized nanometal particles are bonded to a surface of flake graphite; and
   a polydopamine coating layer,
   wherein the polydopamine coating layer is formed on the nanometal-flake graphite by bonding polydopamine to the nanometal particles.

2. The nanometal-flake graphite composite of claim 1, wherein, in the nanometal-flake graphite, the crystallized nanometal particles are contained in an amount of 20 wt % to 50 wt % based on total flake graphite and have a surface coverage of 30% to 70%.

3. The nanometal-flake graphite composite of claim 1, wherein the nanometal is selected from the group consisting of alkali metals, alkaline earth metals, lanthanides, actinides, transition metals, post-transition metals, and metalloids.

4. The nanometal-flake graphite composite of claim 3, wherein the nanometal comprises at least one particle selected from the group consisting of nickel (Ni), silicon (Si), titanium (Ti), chromium (Cr), manganese (Mn), iron (Fe), cobalt (Co), copper (Cu), tin (Sn), indium (In), platinum (Pt), gold (Au), magnesium (Mg), and a combination thereof.

5. The nanometal-flake graphite composite of claim 1, wherein the polydopamine coating layer has a thickness of 5 nm to 100 nm.

6. The nanometal-flake graphite composite of claim 1, further comprising a polymer resin which is bonded to the polydopamine coating layer.

7. The nanometal-flake graphite composite of claim 6, wherein the polymer resin comprises at least one resin selected from the group consisting of an epoxy-based resin, a polyethylene-based resin, a polypropylene-based resin, a polystyrene-based resin, an acryl-based resin, a polyvinyl chloride-based resin, and a nylon-based resin.

8. A method of manufacturing the nanometal-flake graphite composite of claim 1, the method comprising steps of:
    (a) preparing a weakly basic dopamine aqueous solution;
    (b) dipping nanometal-flake graphite in the dopamine aqueous solution; and
    (c) forming a polydopamine coating layer on a surface of the nanometal-flake graphite.

9. The method of claim 8, wherein, in step (a), the dopamine aqueous solution has a pH of 8 to 14 and a dopamine concentration of 0.1 mg/mL to 5 mg/mL.

10. The method of claim 9, wherein, in step (b), the dipping is performed for 0.5 to 24 hours.

11. The method of claim 8, further comprising adding a polymer resin to be bonded to the polydopamine coating layer.

* * * * *

UNITED STATES PATENT AND TRADEMARK OFFICE
CERTIFICATE OF CORRECTION

PATENT NO. : 9,789,539 B2
APPLICATION NO. : 15/108034
DATED : October 17, 2017
INVENTOR(S) : Seong-In Kim Page 1 of 1

It is certified that error appears in the above-identified patent and that said Letters Patent is hereby corrected as shown below:

In the Specification

Column 11, Line 50, "10μm" should read -- 10nm --

Signed and Sealed this
Twenty-ninth Day of May, 2018

Andrei Iancu
*Director of the United States Patent and Trademark Office*